(12) United States Patent
Wallach

(10) Patent No.: US 7,893,960 B1
(45) Date of Patent: Feb. 22, 2011

(54) SMART SENSORS FOR PERIMETER AND BORDER SECURITY

(76) Inventor: Morton L. Wallach, 187 Ledgewood Rd., Apt. 407, Groton, CT (US) 06340

( * ) Notice: Subject to any disclaimer, the term of this patent is extended or adjusted under 35 U.S.C. 154(b) by 864 days.

(21) Appl. No.: 11/693,772

(22) Filed: Mar. 30, 2007

Related U.S. Application Data

(60) Provisional application No. 60/744,279, filed on Apr. 5, 2006.

(51) Int. Cl.
*H04N 7/12* (2006.01)
(52) U.S. Cl. .................. 348/164; 348/143; 348/152; 348/156; 348/161
(58) Field of Classification Search .............. 348/164, 348/143, 152, 156, 161
See application file for complete search history.

(56) References Cited

U.S. PATENT DOCUMENTS 4,209,691 A * 6/1980 Hunt .................. 250/214 VT
6,002,427 A * 12/1999 Kipust ................. 348/156

* cited by examiner

*Primary Examiner*—Joseph G Ustaris
*Assistant Examiner*—Geepy Pe
(74) *Attorney, Agent, or Firm*—Mark Nowotarski

(57) ABSTRACT

A border or perimeter is protected from intruders, such as illegal immigrants, terrorists with WMD or smugglers of drugs. The method comprises a detection and communication processing system capable of a high probability of detection and low probability of false positives. The system includes land-based sensor particles and sensitive airborne or land-based camera processing units. The sensors are sown over key border or perimeter landscape areas and are activated by specific pressure levels characteristic of the weight of transiting intruders whereby the sensors emit characteristic optical signals. Specific emitted indicators detect people, vehicles, or particular animals.

31 Claims, 2 Drawing Sheets

SMART SENSORS FOR PERIMETER AND BORDER SECURITY

CROSS-REFERENCE TO RELATED APPLICATION

This application claims the benefit of U.S. provisional patent application Ser. No. 60/744,279, filed Apr. 5, 2006, and entitled "Border Protection Sensor". Said provisional application is incorporated herein by reference.

FIELD OF THE INVENTION

This invention is in the field of perimeter security

BACKGROUND

Many illegal immigrants enter the U.S. via its borders, such as its southern border, and innovative low cost techniques are needed to detect and communicate their physical presence. Border crossers can potentially include terrorists with WMD and smugglers of illegal drugs.

SUMMARY OF INVENTION

The Summary of the Invention is provided as a guide to understanding the invention. It does not necessarily describe the most generic embodiment of the invention or all species of the invention disclosed herein.

This application discloses a smart sensor design, method of use, and various applications including detection via signal processing technology for a surveillance system to detect and track people, such as adults or children, and vehicles crossing a border or crossing a perimeter. The method will establish performance criteria to achieve high probability of detection and low probability of false alarm measures of effectiveness.

Use of the term "smart sensor" throughout indicates that the sensor will respond to a stimulus with a detectable response. In this case the stimulus is pressure to activate the sensor exposing a luminescent surface. An activated sensor will respond to optical interrogation of light with wave length 1 and emit response light of wave length 2. Wavelength 1 and wavelength 2 may be infrared (IR).

DETAILED DESCRIPTION

The following detailed description discloses various embodiments and features of the invention. These embodiments and features are meant to be exemplary and not limiting.

The method employs low cost, luminant coated, smart micro-sensor, dual bead polymer composites. Each smart micro-sensor composite can be 0.05 to 50 mm in diameter and sown on a landscape surface. A preferred range of diameters is 1 to 3 mm.

The characteristic weight of persons or vehicles traversing an area covered with these sensors will cause the sensors to activate—breaking apart the two particles—one of which will emit a characteristic optical signature. The activated sensors will luminesce at a first IR wavelength upon IR interrogation at a second wavelength and will respond specifically to various triggers (e.g., for people, vehicles, or large animals) revealing the track of the particular triggering entity.

Optical secondary sensor cameras and an IR illuminator mounted on aircraft, search vehicles, or towers will detect, process and distribute the optical data electronically.

The sensor particles can be mass-produced at very low cost of just a few cents per particle. The sensors are readily deployed from air or surface craft using conventional spray techniques and will readily blend in with the landscape.

People or vehicles passing over the landscape or a perimeter will produce three desired effects: (1) a transmitted pressure which activates the sensor on the ground, (2) produce a luminescent infrared sensor signal, and (3) display a profile signature which will differentiate between people, vehicles and animals and eliminate false positives. This system will operate well by day or night and in fog. The polymeric sensor composite material can be environmentally degradable in normal border or perimeter conditions.

Description of Sensor Particle

Figure 1:
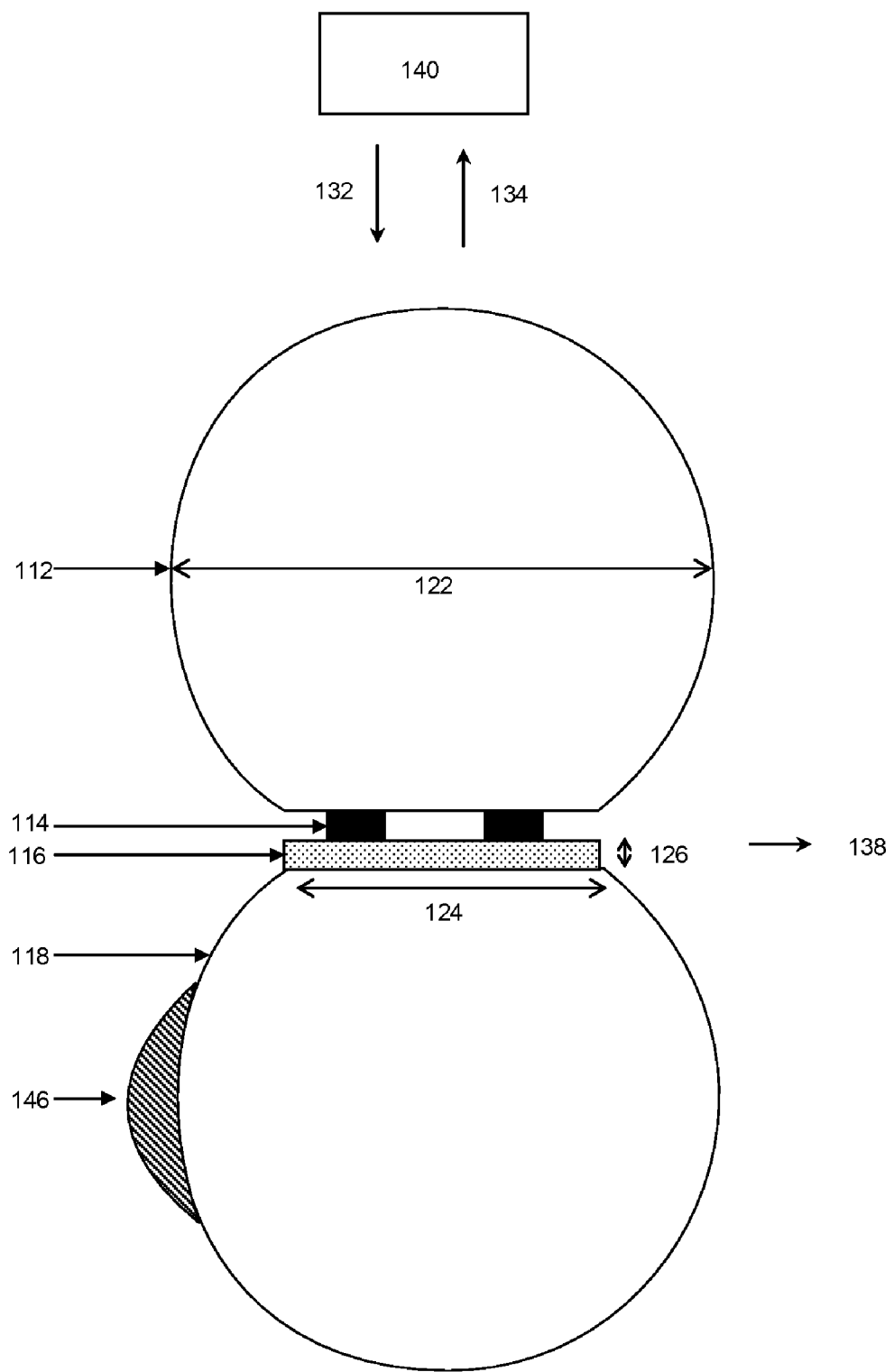
FIG. 1 is a side view of an exemplary smart sensor particle suitable for the process disclosed herein.

FIG. 1 illustrates a sensor composite particle 100 suitable for detecting a person crossing a border. The sensor particle comprises two truncated beads 112 and 118 connected together by one or more drops of adhesive 114. The beads can be generally spherical or other shapes (e.g., ellipsoidal) with a relatively flat surface 124 at an interface where a luminant 116 (coated first) and then an adhesive 114 (on top of the luminant) are each coated on to the bead. The flat area 124 can be smaller when the particles are designed for higher degrees of pressure sensitivity.

This design will ensure that the emitted luminant radiation is seen by a detector 140 (e.g., camera) when the particles have been activated, wherein they break into two separate beads. The adhesive will be such as to transmit the luminant light which is typically in the infrared at 800 nm interrogation light 132 and 980 nm emitted radiation 134. Other detectable luminant radiation in the wave length region where the adhesive is has a transmission level of at least 10 percent and preferably more than 90 percent, can also be employed.

Any fluorescent leakage 138 prior to activation from the luminant edge area 126 (~0.01 mm2) perpendicular to the flat area 124 (~1 mm2) will be very weak because of the very small cross section available to the interrogating light. The exposed luminant area will be much larger (e.g. 100×). As a result there may be a very weak background signal relative to the activated signal. Such a weak background can be normalized out, or possibly ignored, and should not affect the functionality of the sensor system.

The sensor particles will still retain a useful amount of functionality even if a significant amount of luminant material is normally exposed.

Figure 2:
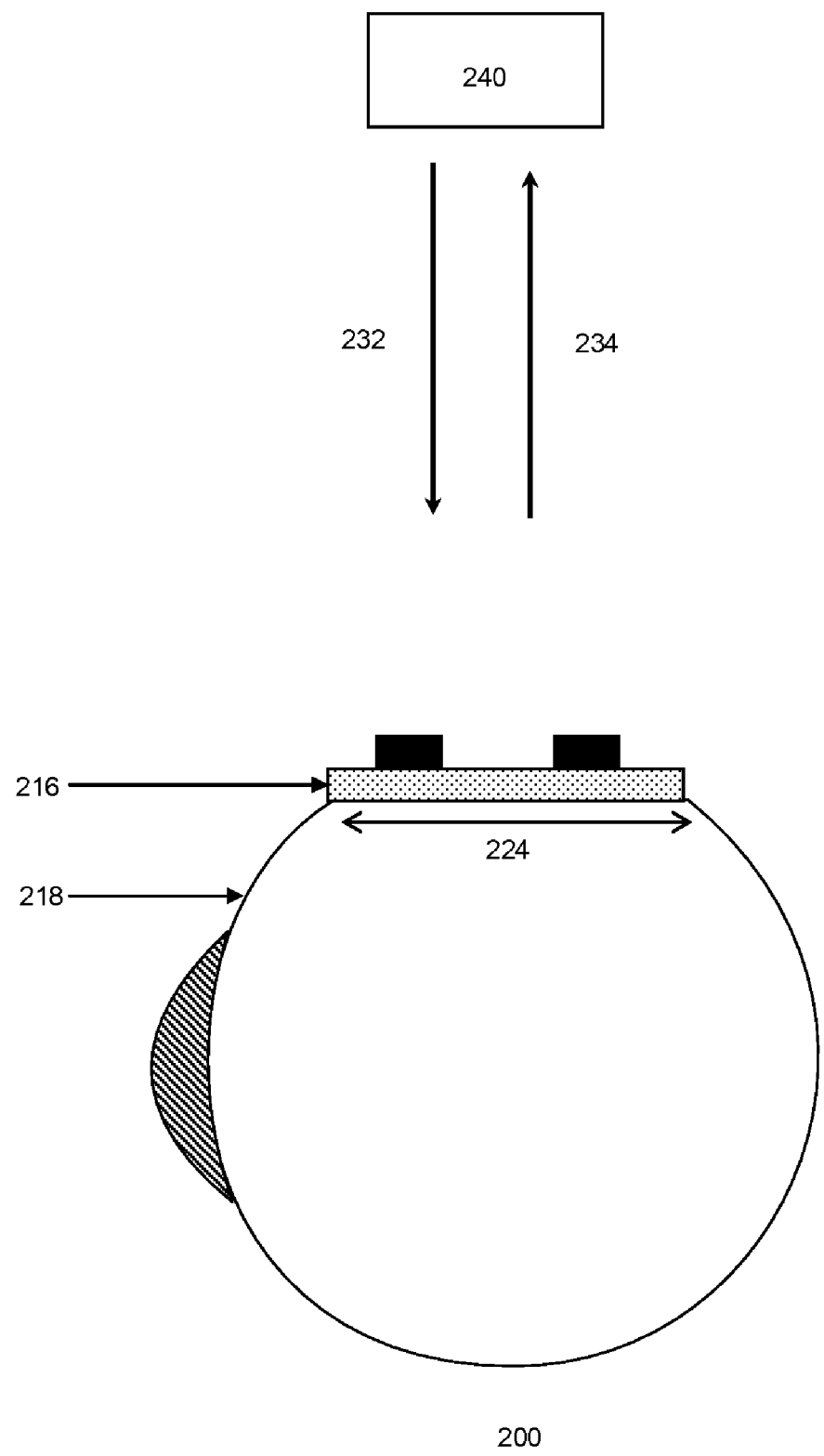
FIG. 2 is a side view of an exemplary smart sensor particle suitable for the process disclosed herein after said sensor particle has been activated.

FIG. 2 illustrates the sensor particle 200 after it has been activated by the pressure of a person's foot. The first bead has broken away from the second bead 218 revealing the face of the luminant coating 216. The interrogation IR beam 232 illuminates the luminant area 224 and a strong emission signal 234 then becomes visible to the sensor detector 240.

Method of Fabrication of Sensor Particles

Perimeter (or border) sensor particles similar in design to those illustrated in FIG. 1 are prepared with selected adhesive (such as "425" from Loctite/Henkel). The beads are truncated spheres with a 2 mm diameter and a flat area 1 mm in length. Suitable flat areas can have lengths in the range of 1/10 to 1.0 times the diameter of the bead. A preferred range length of flat areas can be in the range of ½ to ¾ times the diameter of the bead.

The adhesive of carefully controlled adhesive strength (depending on application) is applied to one of the beads in the two bead sensor particles. The beads are then held together for a few seconds to minutes, and then allowed to cure (typically overnight at room temperature). Adhesive "425" is a moisture-cured cyanoacrylate which sets in about two minutes and cures in about 24 hours. Moisture neutralizes the acid stabilizer to effect the cure.

The beads are thereby held together by an adhesive bond of carefully controlled strength. In general, the desired composite activation level and adhesive strength is attained by calibration of adhesive amount and thickness. In the example given, two small drops (~0.05 ml each) of adhesive are applied to achieve adhesive strength corresponding to sensor activation by at least the pressure applied by a typical adult person (~100-200 lbs) stepping on the sensor. On application of three-four adhesive drops the sensor will activate if stepped on by at least a large animal (200-400 lbs), and with five-six drops, the sensor is activated by at least the weight of a small vehicle (1500-2500 lbs). Application of the small drops is achieved by letting the adhesive drop form at the end of a needle or a pick tool and applying it to one of the particles.

An alternate stronger adhesive ("401") can be suited to heavier intruders such as vehicles. The desired amount of adhesive can be attained by calibration in a given situation. A suitable range of total adhesive volume is 0.0005 and 2.0 ml. A preferred range is 0.05 and 0.5 ml.

There are many adhesives which, when calibrated, will function in this application. Typically one component adhesives are desirable, but two component adhesives should also be functional.

The end use of perimeter security is ordinarily carried out with a mixture of several (typically three) selected pressure sensitivities, so that one can then determine the exact type of entity which activates the sensors (e.g., person, animal, or vehicle). The optical signal can be so designed that each of the sensor levels emits a different wave length (e.g., color).

An exemplary system comprises pressure-activated primary sensor composites that will act as intruder markers, and a secondary sensor consisting of an optical or infrared sensing imaging system (e.g., camera) located on surveillance aircraft (helicopter, drone, etc) or lookout towers. Other sensors whose optical properties change when exposed to certain pressures are suitable as well. The pressure level to activate sensors by people, vehicle or animal, respectively can be dialed in via coating and adhesive design.

The primary sensor composite particles will be sown in a barrier field from aircraft, surface craft or vehicle. Typically 3-4 lines of sensors will be deployed per selected area. In subsequent deployment, 3-4 new lines will be sown ~¼-½ mile further out from the border. The system includes a deployment mechanism to ensure uniform horizontal dispersion of the material in targeted areas.

Particles can be made of any suitable material such as wood, metal or polymer (e.g. plastic). A preferred material is plastic. The particles can have a finite life due to the desirable environmental degradation of the bead material. In general, biodegradability can be controlled by material composition (e.g., taking from 1-3 months to break up). Environmentally degradable materials include wood and environmentally degradable plastic.

To reduce detectability of sown sensors on the ground by people crossing the perimeter, the composites can be colored the same as the background around it.

To reduce any effects of wind which might displace the sensors, the sensors can have a small amount of external adhesive 146 on the particle surface (in an area away from the luminant) in order to stabilize the particle in a given spot on the ground by sticking to it.

The sensor signals are ultimately integrated into a communication system located on air or land craft to provide automatic multi-sensor detection and tracking, thereby enabling continuous tracking of border or perimeter intrusion. This provides valid signal processing for reliable detection, tracking and classification of small targets in a rural or urban environment employing a highly sensitive camera/computer system. Examples of cameras evaluated for this type of application are the Sony SNC-Z20N and the Cohu 2700. These generation I cameras will detect sensor laden landscape densities of 1 particle per square meter with emissions as low as 0.02 lux/particle even at moderate surveillance altitudes of up to 200 feet. Generation II cameras are even more sensitive out to 0.0001 lux or better and even higher altitude. Current sensor emission is about 0.05-0.07 lux/particle when irradiated with an IR beam at the appropriate wavelength and intensity for the luminescent material of the sensor.

Signal processing detection probability algorithms are discussed below to demonstrate high probability of detection (Pd) with low false alarm rate (Pfa). Also, specific signal patterns for people or vehicles or animals moving through the sensor field will be obtained offering a characteristic signature for each entity.

Probability of Detection by Primary Sensor Particles

The probability of a primary sensor particle contacting a group of one or more people or a vehicle can be determined by simple statistical methods. Suitable probability of detection of a typical adult person, for example, may be in the range of 0.9 to 1.0. A preferred range of probability of detection may be in the range of 0.95 to 1.0.

For a uniform line barrier configuration of sensors, we assume the sensors are laid in a series of x lines perpendicular to the direction of the crosser course with equal spacing, D, between the sensors. The probability of detection of an intruder penetrating the line is:

$$P = d/D \quad \text{if } d <= D$$
$$= 1 \quad \text{if } d > D$$

where d=breadth of the vehicle or group of people whose centerline passes within distance d/2 of the sensor D=distance between sensors The probability that the persons or vehicle will be detected is then $$P = 1 - (1 - d/D)^x$$

As an example, if the particle sensors are distributed at 10-ft intervals in two lines, the probability of a least one particle being activated by an 8 ft diameter vehicle or cross section of people is 0.96

For n sensors randomly distributed in the field, the probability of detection by at least one sensor is $$P1 = 1 - (1 - Ld/A)^n$$

If we randomly deploy n=100 sensors in a circular field of 500 ft. diameter and assume the transit within the sensor field to be L=350 ft. for a group of people or vehicle of diameter d=18 ft., Ld/A=0.032 and P1=0.96. A is the area of the field, about 200,000 square feet.

A key feature of this method is that on contact, a sensor indicates the exact position of the person or vehicle at any given time and the activated sensor configuration is specific to persons, people, vehicle, or animal. So the probability of a vehicle being detected at a sensor point of contact is 1. Even with some degree of sensor movement within a barrier due to wind motion, the probability of detection at a given time after first contact is still 1, independent of barrier configuration.

If detection is attempted some time after first sensor contact, the location is less than certainty and decreases as the wind currents wash out the particles. This suggests that the patrol aircraft or ground detection vehicle or tower must sweep the area on a regular basis to effectively use the particle shedding technology proposed. The particle density and small external adhesive area on its surface will be designed to minimize wind displacement.

EXAMPLES

1. Several activated sensors along the southern border of the US are detected by a drone surveillance plane cruising at 50 feet altitude, and equipped with a Gen I Cohu 2700 camera. The camera senses a 980 nm signal of over 0.003 lux intensity. The signal is of such a wave length that the activation is from sensors with pressure requirements in the range of people activators. The drone system automatically wires security personnel re the location of suspected intruders.
2. Nuclear power plant II near a US city is equipped with perimeter sensors sown along its periphery. Eastern surveillance tower No. 3 scanning camera Sony (SNC-Z20N) along the plant periphery picks up a sensor signal of 0.005 lux. The wave length 870 nm is indicative of a vehicle. Meanwhile the Northern Tower picks up a signal of 0.003 lux of 870 nm at the same time. With strategically placed mirrors and triangulation the exact location of the vehicle is pinpointed. Security personnel are notified instantaneously and take required action.
3. An important meeting is proceeding at the capital and high level officials are present. The federal building has recently been equipped with perimeter sensors (both people, and vehicle types). The alarm rings during recess and various officials are alerted. For such a meeting both airborne helicopters and surveillance towers are equipped with Gen II cameras and by triangulation they detect two different IR wave lengths, each indicative of a different location. An explosive laden vehicle is detected at the main entrance, and disruptive terrorists at the rear official entrance. Almost instantaneously, the terrorists and vehicle are engaged, preempting a potentially deadly explosion with no serious injuries.

Commercial Applications

Commercial uses for this system are readily apparent in building and equipment asset protection from vandals, insurgents, and terrorists. Potential applications include Federal and State buildings, airports, chemical and nuclear power plants. It is anticipated that this technology will be adopted by Federal agencies, such as DOE (Department of Energy), with responsibility for safekeeping of nuclear materials. The technology can also be used by the military to protect equipment, and storage of key materials.

The areas that may be protected by the inventions described herein include but are not limited to:

a. the US border;
b. a chemical plant;
c. a building;
d. a Federal building;
e. a State building;
f. a nuclear power plant;
g. an oil or natural gas fired power plant;
h. a coal fired power plant;
i. an airport;
j. a nuclear material storage area;
k. a biological material storage area;
l. an piece of industrial equipment;
m. a university campus;
n. a commercial campus;
o. a military base;
p. a storage facility;
q. an oil field; or
r. an oil refinery.

Benefits/Commercial Uses

The method will deter illegal entry to U.S. via it's southern or other border. It should greatly reduce the entry of illegal immigrants, terrorists with possible WMD, and smugglers of illegal drugs. Non-DHS (Department of Homeland Security) uses are apparent in perimeter protection of airports, military bases, equipment, federal buildings and storage areas of sensitive materials such as nuclear or biological materials. The technology can also be extended to protection of oil fields and refineries, nuclear and chemical plants.

I claim:

1. A sensor composite particle comprising:
   a. a first bead;
   b. a second bead comprising a fluorescent area;
   c. an adhesive; and
   d. a fluorescent coating which will emit a first wavelength of light when interrogated with a second wavelength of light;
   wherein:
   e. said fluorescent coating covers said fluorescent area; and
   f. said first bead is bonded to said second bead with said adhesive such that:
      i. said fluorescent coating is substantially obscured by said first bead; and
      ii. said first bead will break away from said second bead exposing said fluorescent coating when said composite particle is subjected to a pressure greater than or equal to that of a given weight being placed on said sensor composite particle.
2. The sensor composite particle of claim 1 wherein said pressure of a given weight being placed on said sensor composite particle is the pressure of a typical adult's foot stepping on said sensor composite particle.
3. The sensor composite particle of claim 1 wherein said first wavelength and said second wavelength are in the visible or IR.
4. The sensor composite particle of claim 3 wherein said first wavelength is 980 nm and said second wavelength is 800 nm.
5. The sensor composite particle of claim 1 wherein said beads are truncated spheres or truncated ellipsoids and wherein said beads comprise plastic.
6. The sensor composite particle of claim 5 wherein:
   a. the diameter of said beads is in the range of 0.05 to 50 mm;
   b. the length of said fluorescent area of said beads is in the range of $1/10$ to 1.0 times the diameter of said beads; and c. said adhesive is between 0.005 and 2.0 ml of moisture activated cyanoacrylate.

7. The sensor composite particle of claim 5 wherein:
   a. the diameter of said beads is in the range of 1 to 3 mm;
   b. the length of said fluorescent area of said beads is in the range of ½ to ¾ times the diameter of said beads; and
   c. said adhesive is between 0.05 and 0.5 ml of moisture activated cyanoacrylate.

8. The sensor composite particle of claim 1 wherein said beads comprise wood, metal, glass or polymer.

9. The sensor composite particle of claim 1 wherein said beads comprise plastic or environmentally degradable plastic.

10. The sensor composite particle of claim 1 which additionally comprises an external adhesive such that said particle will stick to a landscape when it is placed on it.

11. A method comprising the steps of:
    a. dispersing one or more sensor composite particles on an area adjacent to a perimeter or border, each of said sensor composite particles comprising:
       i. a first bead;
       ii. a second bead comprising a fluorescent area;
       iii. an adhesive; and
       iv. a fluorescent coating which will emit a first wavelength of light when interrogated with a second wavelength of light;
    wherein:
       v. said fluorescent coating covers said fluorescent area; and
       vi. said first bead is bonded to said second bead with said adhesive such that:
          1. said fluorescent coating is substantially obscured by said first bead; and
          2. said first bead will break away from said second bead exposing said fluorescent coating when said composite particle is subjected to a pressure greater than or equal to that of a given weight being placed on said sensor composite particle;
    b. interrogating at least a portion of said area adjacent to said perimeter or border with a beam comprising said second wavelength of light;
    c. monitoring said area adjacent to said perimeter or border with a secondary sensor camera capable of detecting light at said first wavelength; and
    d. triggering an alarm if said secondary sensor camera detects light at said first wavelength at a given intensity, said given intensity being greater than the background intensity of light at said first wavelength.

12. The method of claim 11 wherein said pressure of a given weight being placed on said sensor composite particle is the pressure of a typical adult's foot stepping on said sensor composite particle.

13. The method of claim 11 wherein said first wavelength and said second wavelength are in the IR.

14. The method of claim 11 wherein said secondary sensor camera is capable of detecting said first wavelength at an intensity of at least 0.0001 lux.

15. The method of claim 11 wherein said one or more sensor composite particles are distributed such that the probability of detection of an intruder crossing said area adjacent to said perimeter or border is in the range of 0.9 to 1.0.

16. The method of claim 11 wherein said one or more sensor composite particles are distributed such that the probability of detection of an intruder crossing said area adjacent to said perimeter or border is in the range of 0.95 to 1.0.

17. The method of claim 11 wherein said secondary sensor camera is mounted on an aircraft and said method further comprises flying over said area adjacent to said perimeter or border with said aircraft such that said secondary sensory camera may view at least a portion of said area adjacent to said perimeter or border.

18. The method of claim 11 wherein said perimeter or border is at least a portion of the perimeter or border of one or more of:
    a. the United States;
    b. a chemical plant;
    c. a building;
    d. a Federal building;
    e. a State building;
    f. a nuclear power plant;
    g. an oil or natural gas fired power plant;
    h. a coal fired power plant;
    i. an airport;
    j. a nuclear material storage area;
    k. a biological material storage area;
    l. a piece of industrial equipment;
    m. a university campus;
    n. a commercial campus;
    o. a military base;
    p. a storage facility;
    q. an oil field; or
    r. an oil refinery.

19. A system comprising:
    a. one or more sensor composite particles dispersed on an area adjacent to a perimeter or border, each of said sensor composite particles comprising:
       i. a first bead;
       ii. a second bead comprising a fluorescent area;
       iii. an adhesive; and
       iv. a fluorescent coating which will emit a first wavelength of light when interrogated with a second wavelength of light;
    wherein:
       v. said fluorescent coating covers said fluorescent area; and
       vi. said first bead is bonded to said second bead with said adhesive such that:
          1. said fluorescent coating is substantially obscured by said first bead; and
          2. said first bead will break away from said second bead exposing said fluorescent coating when said composite particle is subjected to pressure greater than or equal to that of a given weight being placed on said sensor composite particle;
    b. an illuminator to emit an interrogation beam comprising said second wavelength of light;
    c. a secondary sensor camera capable of detecting light at said first wavelength; and
    d. an alarm which is triggered if said secondary sensor camera detects light at said first wavelength at a given intensity, said given intensity being greater than the background intensity of light at said first wavelength.

20. The system of claim 19 wherein said first wavelength of light is in the visible spectrum.

21. The system of claim 19 wherein at least 99% of the area of said fluorescent coating is obscured by said first bead when said first bead is bonded to said second bead.

22. The system of claim 19 wherein the shape of said second bead is ellipsoidal.

23. The system of claim 19 wherein said fluorescent area is relatively flat compared to the rest of the surface of said second bead.

24. The system of claim 19 wherein said sensor composite particles comprise one or more first composite particles and one or more second composite particles wherein:
   a. said first composite particles comprise a first fluorescent coating and a first adhesive such that said first composite particles will break apart at a first pressure;
   b. said second composite particles comprise a second fluorescent coating and a second adhesive such that said second composite particles will break apart at a second pressure; and
   c. said first pressure is the pressure of a typical adult person stepping on said first particle and said second pressure is the pressure of a small vehicle rolling over said second particle.

25. The system of claim 19 wherein said perimeter is that of a storage area.

26. The method of claim 11 wherein said first wavelength of light is in the visible spectrum.

27. The method of claim 11 wherein at least 99% of the area of said fluorescent coating is obscured by said first bead when said first bead is bonded to said second bead.

28. The method of claim 11 wherein the shape of said second bead is ellipsoidal.

29. The method of claim 11 wherein said fluorescent area is relatively flat compared to the rest of the surface of said second bead.

30. The method of claim 11 wherein said sensor composite particles comprise one or more first composite particles and one or more second composite particles wherein:
   a. said first composite particles comprise a first fluorescent coating and a first adhesive such that said first composite particles will break apart at a first pressure;
   b. said second composite particles comprise a second fluorescent coating and a second adhesive such that said second composite particles will break apart at a second pressure; and
   c. said first pressure is the pressure of a typical adult person stepping on said first particle and said second pressure is the pressure of a small vehicle rolling over said second particle.

31. The method of claim 11 wherein said perimeter is that of a storage area.

\* \* \* \* \*